United States Patent
Jose et al.

(10) Patent No.: US 10,244,480 B2
(45) Date of Patent: Mar. 26, 2019

(54) WIRELESS STATION RELYING ON HIBERNATION FOR POWER SAVINGS IN A WIRELESS LOCAL AREA NETWORK

(71) Applicant: GainSpan Corporation, San Jose, CA (US)

(72) Inventors: Sharath Jose, Bangalore (IN); Sibasis Purohit, Bangalore (IN)

(73) Assignee: GAINSPAN CORPORATION, San Jose, CA (US)

( * ) Notice: Subject to any disclaimer, the term of this patent is extended or adjusted under 35 U.S.C. 154(b) by 0 days.

(21) Appl. No.: 15/408,423

(22) Filed: Jan. 18, 2017

(65) Prior Publication Data
US 2018/0049134 A1    Feb. 15, 2018

(30) Foreign Application Priority Data

Aug. 12, 2016 (IN) .............................. 201641027668

(51) Int. Cl.
| | | |
|---|---|---|
| *H04W 52/02* | (2009.01) | |
| *H04W 40/02* | (2009.01) | |
| *H04W 84/12* | (2009.01) | |
| *H04W 88/08* | (2009.01) | |

(52) U.S. Cl.
CPC ....... *H04W 52/0274* (2013.01); *H04W 40/02* (2013.01); *H04W 52/0235* (2013.01); *H04W 52/0261* (2013.01); *H04W 84/12* (2013.01); *H04W 88/08* (2013.01)

(58) Field of Classification Search
CPC .............................................. H04W 52/0274
See application file for complete search history.

(56) References Cited

U.S. PATENT DOCUMENTS

| | | | |
|---|---|---|---|
| 6,463,307 B1 | 10/2002 | Larsson et al. | |
| 8,867,419 B2 | 10/2014 | Salomone et al. | |
| 9,014,765 B2 | 4/2015 | Qi et al. | |
| 9,313,738 B2 | 4/2016 | Sinha | |
| 2005/0190709 A1* | 9/2005 | Ferchland | H04W 52/0287 370/311 |
| 2006/0025181 A1 | 2/2006 | Kalofonos et al. | |
| 2006/0128349 A1* | 6/2006 | Yoon | H04L 12/12 455/343.2 |
| 2009/0088194 A1 | 4/2009 | Petty, Jr. et al. | |

(Continued)

FOREIGN PATENT DOCUMENTS

| | | |
|---|---|---|
| CN | 1764089 A | 4/2006 |
| CN | 103297333 A | 9/2013 |

OTHER PUBLICATIONS

The Current and Future Advantages of Using Wi-Fi Modules in IoT Designs, http://www.digikey.com/en/articles/techzone/2016/apr/the-current-and-future-advantages-of-using-wifi-modules-in-iot-designs, Downloaded circa Jul. 20, 2016, pp. 1-4.

*Primary Examiner* — Jason E Mattis
(74) *Attorney, Agent, or Firm* — Pearl Cohen Zedek Latzer Baratz LLP

(57) ABSTRACT

A wireless station hibernates in a duration. The wireless station switches off an oscillator in at least a part of the duration. The oscillator is used to drive a portion of the wireless station. In an embodiment, the portion of the wireless station corresponds to a time keeping circuit, the time keeping circuit being rendered inoperative in the duration due to switching off of the oscillator.

15 Claims, 5 Drawing Sheets

(56) References Cited

U.S. PATENT DOCUMENTS

| | | | |
|---|---|---|---|
| 2009/0199037 A1* | 8/2009 | Venkatesh | G06F 1/12 713/502 |
| 2013/0003626 A1* | 1/2013 | Husted | H04W 52/0293 370/311 |
| 2013/0279381 A1 | 10/2013 | Sampath et al. | |

* cited by examiner

WIRELESS STATION RELYING ON HIBERNATION FOR POWER SAVINGS IN A WIRELESS LOCAL AREA NETWORK

PRIORITY CLAIM

The instant patent application claims priority from co-pending India provisional patent application entitled, "Reducing power consumption in a wireless station relying on hibernation for power savings", Application Number: 201641027668, Filed: 12 Aug. 2016, naming Sharath Jose and Sibasis Purohit as the inventors, and is incorporated it its entirety herewith, to the extent not inconsistent with the content of the instant application.

BACKGROUND

Technical Field

Embodiments of the present disclosure relate generally to wireless local area networks (WLANs), and more specifically to wireless stations relying on hibernation for power savings in such a WLAN.

Related Art

A Wireless Local Area Network (WLAN) generally refers to a network in which wireless end devices communicate with each other over a short distance (typically of the order of tens of meters to a couple of hundred meters) using a wireless medium. A WLAN may be designed to contain an access point (AP), and one or more wireless stations (STA, which operate as end devices). The AP is a switch which operates to receive a wireless frame from one STA and forward the received wireless frame to another (target) STA, or to another switch which is in the path to the target STA. STAs of a WLAN can also communicate with other systems/devices (wired or wireless) outside of the WLAN via the AP. A WLAN may be implemented according to IEEE 802.11 family of standards.

Hibernation is a technique employed in wireless stations, typically for saving power. Hibernation entails switching off at least some of the transmission and reception circuitry/components in durations when the wireless station may not need to transmit or receive packets on the WLAN. Thus, in the duration of hibernation, a wireless station is unable to transmit or receive packets. As power is not consumed by the components that are switched off, power savings are realized in the hibernation duration.

Aspects of the present disclosure pertain to such wireless stations which rely on hibernation in a WLAN.

BRIEF DESCRIPTION OF THE VIEWS OF DRAWINGS

Example embodiments of the present disclosure will be described with reference to the accompanying drawings briefly described below.

The drawing in which an element first appears is indicated by the leftmost digit(s) in the corresponding reference number.

DETAILED DESCRIPTION

1. Overview

A wireless station provided according to an aspect of the present disclosure switches off an oscillator at least in a portion of a duration in which the wireless station hibernates. Power consumption may be further reduced as a result. In an embodiment, the wireless station comprises a transmit circuit and a receive circuit, wherein the portion, the transmit circuit and the receive circuit are powered off in the duration to cause the hibernating. In another embodiment, the portion is a digital portion, and wherein the wireless station is unable to both transmit and receive packets in the duration.

According to another aspect of the present disclosure, the wireless station comprises a time keeping circuit for maintaining time based on the oscillator, wherein the time keeping circuit is rendered inoperative in the duration due to switching off of the oscillator. The wireless station may operate to switch on the oscillator to exit hibernation, retrieve a time stamp from an access point (AP) upon exiting the hibernation and reset time in the time keeping circuit based on the time stamp.

In an embodiment, the wireless station maintains a communication entry with an expiry duration. Prior to the switching off, the wireless station records a time point at which the hibernating started. Based on the time stamp and the time point, the wireless station computes a magnitude of the duration and determines whether the expiry duration has elapsed based on the magnitude. If the expiry duration has elapsed, the wireless station concludes (or determines) that the communication entry has expired. The communication entry can represent entries such as a layer-2 connection time out, DHCP (Dynamic Host Configuration Protocol) lease time, TCP (Transmission Control Protocol) connection time out and ARP (Address Resolution Protocol) cache timeout.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
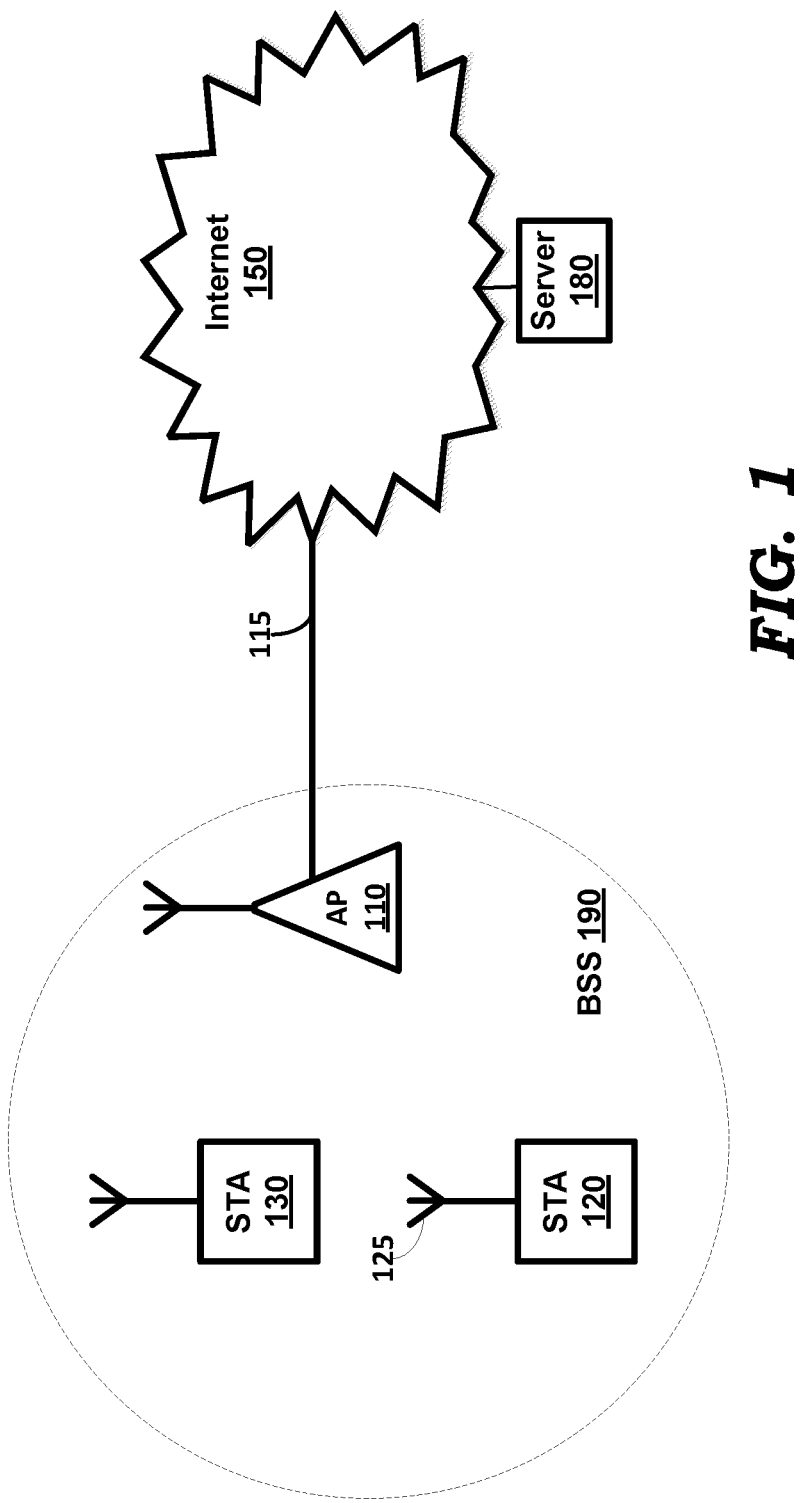
FIG. 1 is a block diagram representing an example environment in which several aspects of the present disclosure can be implemented.

FIG. 1 is a block diagram representing an example environment in which several aspects of the present disclosure can be implemented. The example environment is shown containing only representative systems for illustration. However, real-world environments may contain many more systems/components as will be apparent to one skilled in the relevant arts. FIG. 1 is shown containing Access Point (AP) 110, wireless stations (STA) 120 and 130, internet 150 and server 180.

Internet 150 extends the connectivity of the wireless stations in BSS 190 to various systems (not shown) connected to, or part of, internet 150. Internet 150 is shown connected to AP 110 through a wired path 115. Internet 150 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across WLANs.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

Each of STAs 120 and 130 represents an end device that may execute various user applications. STAs 120 and 130 may communicate with each other via AP 110. Further one or both of STAs 120 and 130 may communicate with devices (such as server 180) in internet 150 also via AP 110. In an embodiment, AP 110, and the STAs 120 and 130 form a basic service set (BSS) 190 consistent with IEEE 802.11 family of standards. The antenna of STA 120 is shown numbered as 125.

The user applications in one or more of 120 and 130 may generate data values, which may be then be transmitted by the STAs to another STA or a device/system in internet 150 (via AP 110). For example, each of STAs 120 and 130 may internally contain one or more sensors, which collect corresponding parameter values such as temperature and pressure in process control systems. The STAs may transmit the sensed values in corresponding data frames. The STAs may also receive data and/or commands from a device in internet 150 via AP 110. A STA may first need to authenticate and associate with AP 110, and continue in the associated state for the STA to be able to send/receive frames via AP 110.

One or both of STAs 120 and 130 may set up communications over corresponding TCP sessions with a device (e.g., server 180) on internet 150 for exchanging the data noted above. Prior to setup of the TCP session, the STAs request for and receive IP addresses from a DHCP server (for example implemented in AP 110) to enable communication with devices in internet 150 using IP (Internet Protocol).

A STA may be operated in hibernation mode for power savings. The manner in which a STA is operative in the hibernation mode is described next with respect to a flowchart.

3. Operations in Hibernation Mode

Figure 2:
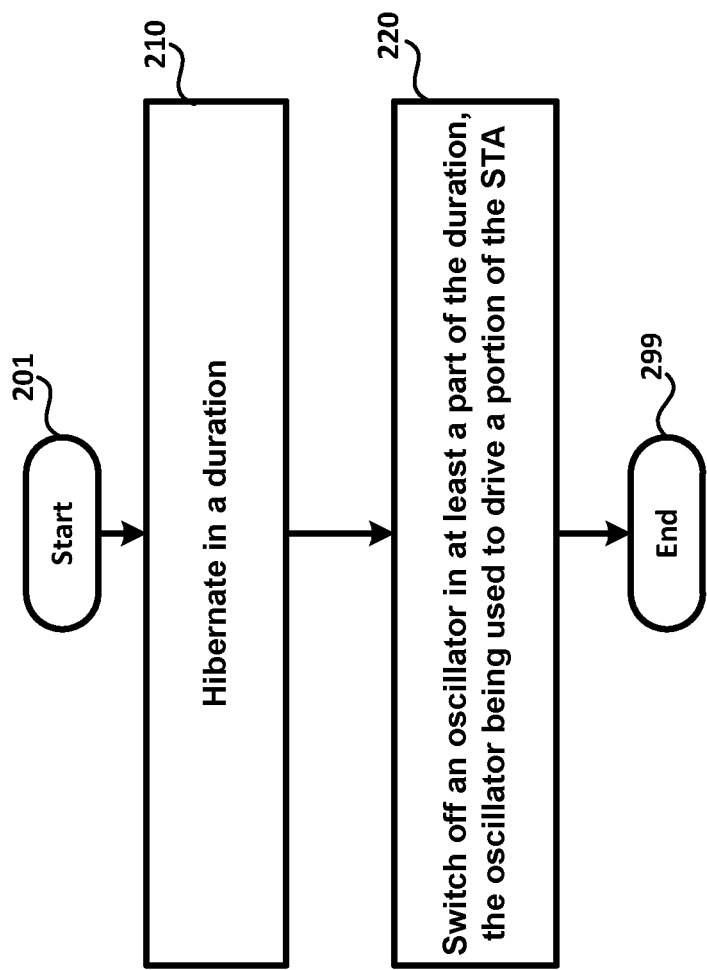
FIG. 2 is a flowchart illustrating the manner in which a wireless station is operated in hibernation mode, according to an aspect of the present disclosure.

FIG. 2 is a flowchart illustrating the manner in which a wireless station is operated in hibernation mode, according to an aspect of the present disclosure. The flowchart is described with respect to the environment of FIG. 1, and in relation to STA 120, merely for illustration. However, various features described herein can be implemented in other environments and using other components and wireless stations as well, as will be apparent to one skilled in the relevant arts by reading the disclosure provided herein. Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, STA 120 is set to be in hibernation mode for a duration of time. As is well known in the relevant arts, hibernation refers to a power-savings/sleep mode for potentially extended duration such as a few minutes, hours or days. Thus, when in the hibernation mode, one or more portions of STA 120 may be powered down to minimize power consumption. For example, transmit and receive circuitry in STA 120 may be powered down, since these typically consume large amounts of power. Entry into hibernation mode may be effected, for example, by a processing block in STA 120 removing (switching off) power to corresponding circuit portions in STA 120. Control then passes to step 220.

In step 220, an oscillator used to drive a portion of STA 120 is switched off in at least a part of the duration for which STA 120 is in hibernation mode. A processing block (e.g., processing block 410 of FIG. 4, described below) in STA 120 may, for example, be used to remove power connection to the oscillator. As a result, clock signal(s) to the portion is cut-off, and additional power-savings is achieved. Control then passes to step 299, in which the flowchart ends.

In an embodiment, the portion of step 220 includes one or more timers in STA 120 that are used to maintain current time. Thus, according to an aspect of the present disclosure, even the oscillator driving such timers in STA 120 is switched off when STA 120 is in the hibernation mode. As a result, STA 120 may be unable to determine the 'current' time when in the hibernation mode, and even after/upon exiting hibernation mode.

As a consequence, STA 120 may be unable to wake up at desired time points in the hibernation duration for activities such as sending keep-alive messages. In general, switching off the oscillator driving the timers in STA 120 implies that STA 120, when in hibernation mode, is incapable of determining whether various connections (previously established with other devices) have timed-out or not. Examples of such connections include layer-2 connectivity with AP 110, layer 3 connectivity with a device in internet 150, etc. Further, STA 120 is incapable of determining whether the time duration for which STA 120 has leased its IP address has expired or not, or whether an ARP (address resolution protocol) table maintained in STA 120 has obsolete information or not.

Layer-2 connectivity refers to the connection established between STA 120 and AP 110 after STA 120 authenticates and associates with AP 110 according to corresponding authentication and association procedures specified by the IEEE 802.11 standard(s). As is well known in the relevant arts, such procedures are required to be performed before AP 110 forwards packets from STA 120 to other devices/ systems, and from other devices/systems to STA 120. AP 110 may be designed to maintain the layer-2 connectivity with STA 120 only so long as the time lapse between successive transmissions from STA 120 does not exceed a predefined limit. AP 110 typically is provided with the value of such time limit, and may disassociate STA 120 (i.e., remove STA 120 from an internal list of associated devices) if such time limit is exceeded.

Layer-3 connectivity refers to a TCP/IP connection that STA 120 may have established with another device, such as server 180 of FIG. 1. Such a TCP/IP connection may also be maintained by the peer device (such as server 180) only so long as the duration between two successive transmissions from STA 120 to the device does not exceed a pre-defined time limit. Such successive transmissions can be either two successive TCP/IP packets or two successive keep-alive packets or one TCP/IP packet and a keep-alive packet.

An IP address leased to STA 120 (for example, by a DHCP server in AP 110 or in internet 150) may be valid and usable only for a pre-defined duration. Before the end of such duration, STA 120 is expected to renew the lease, failing which the IP address may no longer be valid (or supported by routing devices and destination devices). For example, assuming the DHCP server is implemented within AP 110, AP 110 may re-assign an IP address previously assigned to STA 120 to some other device (e.g., STA 130) if the lease duration expires, and STA 120 has not requested for renewal of the lease.

STA 120 may maintain an ARP (Address Resolution Protocol) cache containing a mapping between IP addresses of other devices and the corresponding layer-2 address (Medium Access Control or MAC address) that needs to be used when STA 120 needs to generate IP packets destined to the devices. STA 120 compares the destination IP address for every outbound IP packet (generated and sought to be transmitted by STA 120) to entries in the ARP cache. If STA 120 finds a matching entry, then STA 120 retrieves the corresponding MAC address from the cache and uses the MAC address in encapsulating the IP packet. If STA 120 does not find a matching entry, STA 120 broadcasts an ARP Request frame on the local subnet, requesting that the owner of the IP address reply with its MAC address. When/if STA 120 receives an ARP reply packet, STA 120 updates its ARP cache, and uses the obtained MAC address to encapsulate a corresponding IP packet. If an ARP entry is not used for a specific amount of time (called the ARP timeout) that entry is to be removed from the cache. Hence, when STA 120 next needs to transmit an IP packet to the device whose ARP cache entry was removed, STA 120 may be forced to broadcast another ARP request frame to obtain the MAC address of the device. Hence, the ARP cache entries in STA 120 may be dynamic, and may need to be invalidated (e.g., by removal of the ARP entry) after a pre-determined duration of time.

STA 120 stores, in a memory in STA 120, data (referred to herein as communication entries) representing the time-out duration (i.e., expiry duration) corresponding to each of the layer-2 connectivity, layer-3 connectivity, IP address lease and ARP cache.

According to an aspect of the present disclosure, immediately before entering hibernation mode, STA 120 obtains the current time from a beacon transmitted by AP 110 and stores the current time in a local memory. STA 120 may also scan the wireless medium for beacons from other APs that might be present within communication range of STA 120 (although such APs are not shown in FIG. 1), and store the current time obtained from such other APs. STA 120 may obtain the value of current time from multiple APs as a redundancy measure, i.e., to handle situations of AP misbehaviors (e.g. AP not functional due to power failure). Thus, on exiting hibernation mode, there is a greater possibility of STA 120 obtaining the value of time (immediately after exiting hibernation) from an active AP.

Upon exiting hibernation mode, STA 120 again obtains the current time (time stamp) from AP 110 (or another AP, as noted above). STA 120 compares the current time value obtained upon exiting from hibernation with the time value obtained immediately before entering hibernation mode, and stored earlier (both time values being obtained from a same AP). STA 120 computes the difference between the two time values, the difference being the interval for which STA 120 was in the hibernation mode. Based on the computed difference, STA 120 determines if time-outs corresponding to layer-2 connectivity, layer-3 connectivity, IP address lease and ARP cache (as noted above) have occurred in the duration that STA 120 was in hibernation mode. If any of the time-outs have occurred, STA 120 may renew the corresponding connection (in the case of layer-2 or layer-3 connection time-out) or renew the IP address lease by initiating well-known communication (described in corresponding RFCs), or update the ARP cache to remove the corresponding ARP entry.

Figure 3:
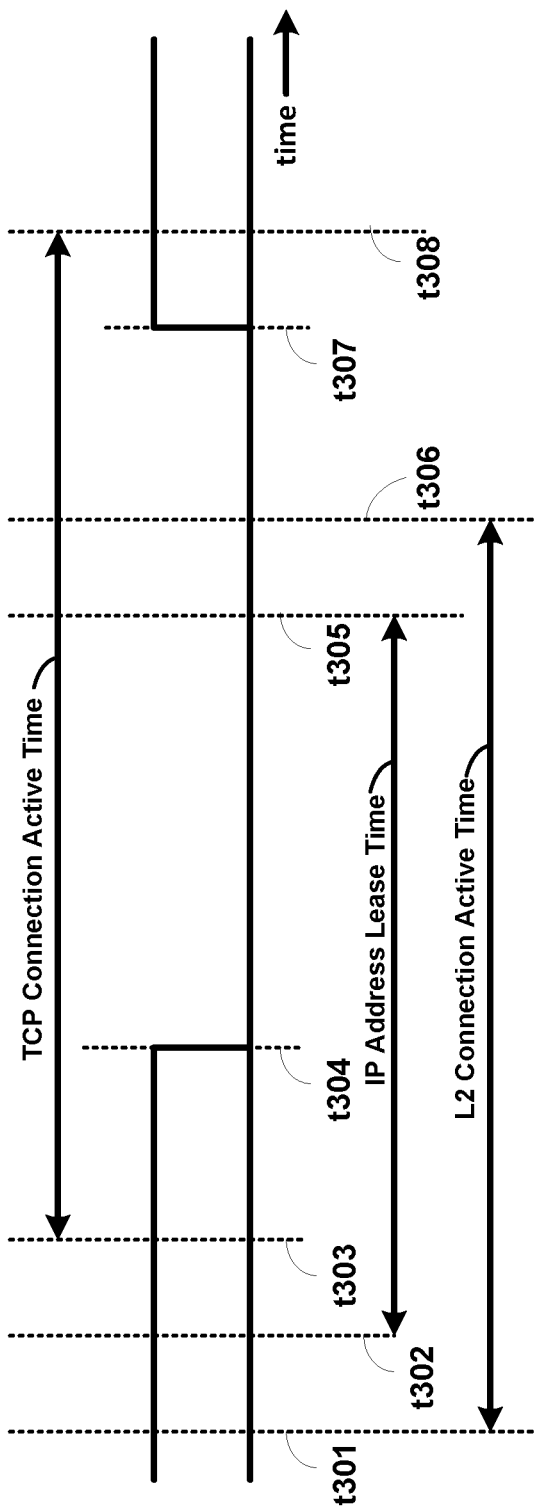
FIG. 3 is a diagram illustrating an example timing sequence of events with respect to a wireless station, in an embodiment of the present disclosure.

FIG. 3 is a diagram illustrating an example timing sequence of events with respect to STA 120. STA 120 is shown in FIG. 3 as entering hibernation mode at time t304, and exiting hibernation mode at time t307. At time t301, STA 120 associates and authenticates with AP 110, and records the time t301 in a local memory. The time at which the layer-2 connection of STA 120 with AP 110 times-out (if STA 120 does not transmit any packets at all to AP 110 after t301) is t306, with the duration t301-t306 indicated as "L2 Connection Active time" in FIG. 3.

At time t302, STA 120 obtains an IP address from a DHCP server (either in AP 110 or in internet 150), and records the time t302 in a local memory. The lease duration of the IP address expires at t305, and the duration t302-t305 is indicated in FIG. 3 as "IP Address Lease Time". At time t303, STA 120 establishes a TCP connection with a device (e.g., server 180) in internet 150, and records the time t303 in a local memory. The TCP connection expires at t308, and the duration t303-t308 is indicated in FIG. 3 as "TCP Connection Active Time". It may be observed that the "L2 Connection Active time" and "IP Address Lease Time" expire in the duration that STA 120 is in hibernation mode.

At or immediately prior to t304, STA 120 obtains the current time (as at t304) from beacons transmitted by one or more APs as noted above. At or immediately after t307, STA 120 again obtains the current time (as at t307) from beacons transmitted by one or more APs as noted above. Based on the difference between the two time values obtained, STA 120 determines (at some time instant later then t307) that "L2 Connection Active time" and "IP Address Lease Time" have expired, but "TCP Connection Active time" has not. Accordingly, STA 120 may associate and authenticate again with AP 110 to re-establish layer-2 connectivity with AP 110, and request for and obtain an IP address. STA 120 may operate correspondingly with respect to ARP cache entry expiry. It is noted that while there is no guarantee that STA 120 will receive the same IP address, there is a substantial likelihood that STA 120 will. However, in the event the same IP address is not received, STA 120 may need to re-establish the TCP connection.

The description is continued with respect to an illustration of the implementation details of STA 120 in an embodiment.

4. Wireless Station

Figure 4:
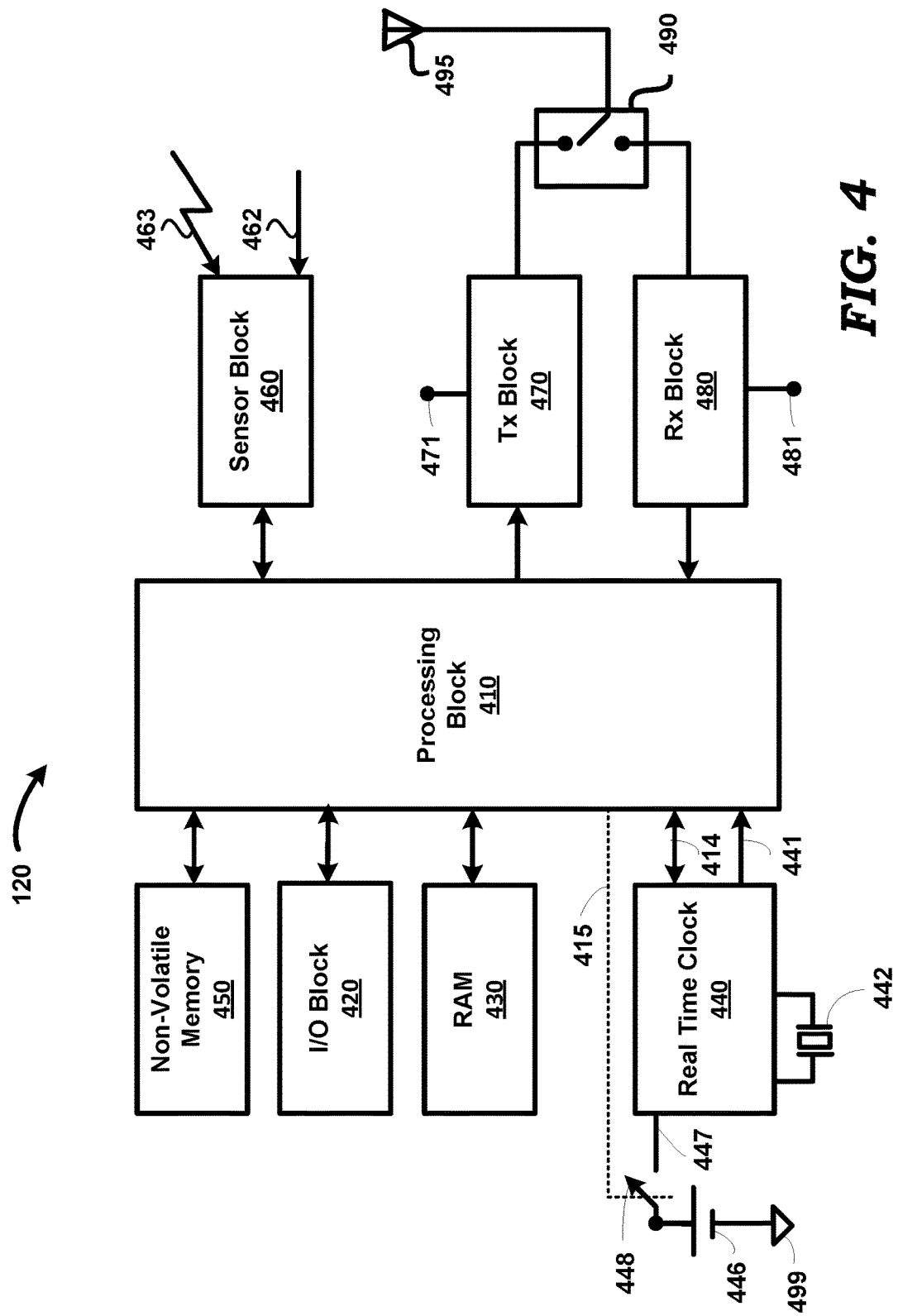
FIG. 4 is a block diagram showing the implementation details of a STA in an embodiment of the present disclosure.

FIG. 4 is a block diagram showing the implementation details of a STA in an embodiment of the present disclosure. STA 120 is shown containing processing block 410, input/ output (I/O) block 420, random access memory (RAM) 430, real-time clock (RTC) 440, battery 446, switch 448, non-volatile memory 450, sensor block 460, transmit (TX) block 470, receive (RX) block 480, switch 490, and antenna 495. The whole of STA 120 may be implemented as a system-on-chip (SoC), except for battery 446 and antenna 495. Alternatively, the blocks of FIG. 4 may be implemented on separate integrated circuits (IC). Terminal 499 represents a ground terminal.

Battery 446 provides power for operation of STA 120, and may be connected to the various blocks shown in FIG. 2, although only the connection to RTC 440 is shown in FIG. 4.

RTC 440 operates as a clock generator (oscillator) as well as a time keeper. RTC 440 generates one or more clocks on path 441. The clock(s) may be used as master/system clocks for coordinating the operation of internal units (such as timers, described below) of RTC 440, as well some or all circuits in processing block 410. The clock(s) may also be used for operation of other components/blocks in STA 120, although not shown in FIG. 4 in the interest of conciseness. RTC 440 contains one or more timers (time-keeping units) internally, which are used to maintain 'current time'. The timer(s) are programmable by processing block 410 via path 414. RTC 440 provides the 'current' time to processing block 410 via path 441. Battery 446 is used to power the timers and oscillators in RTC 440.

Figure 5:
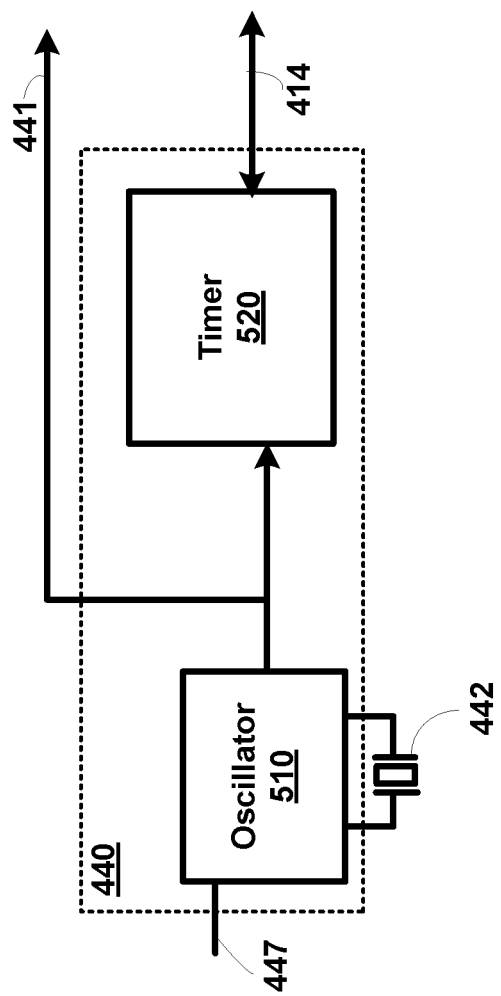
FIG. 5 is a diagram illustrating the internal details of a real-time clock in a STA in an embodiment of the present disclosure.

RTC 440 is shown as being powered by battery 446. When switch 448 is closed, node 447 (which is the power supply terminal of RTC 440) is connected to the battery 446. When switch 448 is open, power to RTC 440 is removed. Switch 448 is controlled to be closed or open via a control signal 415 from processing block 410. The internal details of RTC 440 in an embodiment are shown in FIG. 5, in which RTC 440 is shown containing oscillator 510 and timer 520. Crystal 442 is used by oscillator 510 in generating clock(s) 441. Timer 520 receives clock(s) 441 to enable it to operate to maintain current time.

I/O block 420 provides interfaces for user interaction with STA 120, and includes input devices and output devices. The input devices may include a keyboard and a pointing device (e.g., touch-pad, mouse). Output devices may include a display.

Sensor block 460 may contain one or more sensors, as well as corresponding signal conditioning circuitry, and provides to processing block 410, measurements/values of physical quantities such as temperature, pressure, etc., sensed via wired path 462 or wireless path 463. Sensor block 460 may perform analog-to-digital conversion of the measurement/values prior to forwarding the measurements/values to processing block 410.

Antenna 495, corresponds to antenna 125 of FIG. 1, and operates to receive from, and transmit to, a wireless medium, corresponding wireless signals (e.g., according to IEEE 802.11 (WLAN) standards). Switch 490 may be controlled by processing block 410 (connection not shown) to connect antenna 495 to one of blocks 470 and 480 as desired, depending on whether transmission or reception of wireless signals is required. Switch 490, antenna 495 and the corresponding connections of FIG. 4 are shown merely by way of illustration. Instead of a single antenna 495, separate antennas, one for transmission and another for reception of wireless signals, can also be used. Various other techniques, well known in the relevant arts, can also be used instead.

Tx block 470 (an example of a transmit circuit) receives, from processing block 410, data to be transmitted on a wireless medium (e.g., according to a wireless standard such as IEEE 802.11), generates a modulated radio frequency (RF) signal (according to the standard), and transmits the RF signal via switch 490 and antenna 495. Tx block 470 may contain RF and baseband circuitry for generating and transmitting wireless signals, as well as for medium access operations. Alternatively, Tx block 470 may contain only the RF circuitry, with processing block 410 performing the baseband and medium access operations (in conjunction with the RF circuitry).

Rx block 480 (an example of a receive circuit) represents a receiver that receives a wireless (RF) signal (e.g., according to IEEE 802.11) bearing data and/or control information via switch 490, and antenna 495, demodulates the RF signal, and provides the extracted data or control information to processing block 410. Rx block 480 may contain RF as well as baseband processing circuitry for processing a WLAN signal. Alternatively, RX block 480 may contain only the RF circuitry, with processing block 410 performing the baseband operations in conjunction with the RF circuitry.

Non-volatile memory 450 is a non-transitory machine readable medium, and stores instructions, which when executed by processing block 410, causes STA 120 to operate as described above. In particular, the instructions enable STA 120 to operate as described with respect to the flowchart of FIG. 2. RAM 430 is a volatile random access memory, and may be used for storing instructions and data.

RAM 430 and non-volatile memory 450 (which may be implemented in the form of read-only memory/ROM/Flash) constitute computer program products or machine (or computer) readable medium, which are means for providing instructions to processing block 410. Processing block 410 may retrieve the instructions, and execute the instructions to provide several features of the present disclosure.

Processing block 410 (or processor in general) may contain multiple processing units internally, with each processing unit potentially being designed for a specific task. Alternatively, processing block 410 may contain only a single general-purpose processing unit. Processing block 410 executes instructions stored in non-volatile memory 450 or RAM 430 to enable STA 120 to operate according to several aspects of the present disclosure, described above.

In particular, processing block 410 stores in non-volatile memory 450, communication entries representing the timeout durations corresponding to each of layer-2 connectivity, layer-3 connectivity, IP address lease and ARP cache, as noted above.

Immediately prior to entering hibernation mode, processing block 410 obtains from AP 110 (and possibly other APs as well) the current time, and stores the current time in non-volatile memory 450. Processing block 410 generates signal 415 to open switch 448, thereby disconnecting battery 446 from RTC 440. In the hibernation mode, rendering RTC 440 is therefore incapable of maintaining current time, since the timer 520 is power-down.

Further, processing block 410 may remove power (via a corresponding control path not shown) applied to the power-supply terminals 471 and 481 of Tx block 470 and Rx block 480 respectively, thereby powering down Tx block 470 and Rx block 480 also. Additionally, as noted above, clock(s) 440 may be used as a system clock for enabling operation of circuit portions in processing block 410. Processing block 410 may gate the clock off some of such circuit portions in the hibernation mode to further reduce power consumption.

Thus, in the hibernation mode, only a sub-portion of processing block 410 may be active (powered-ON, and have a clock for its operation). In an alternative embodiment, all portions of processing block 410 are switched-off (powered-down or clock gated) during hibernate mode, and only an external device can wake up processing block 410.

Upon exit from hibernation mode, processing block 410 (or the active sub-portion noted above) closes switch 448, thereby powering oscillator 510 and timer 520 of RTC 440. Additionally, processing block 410 enables power to be applied to Tx block 470 and Rx block 480, as well as enabling clock(s) to be applied to those portions of processing block 410 from which the clock(s) were removed.

Processing block 410 obtains via Rx block 480, the value of current time from a beacon transmitted by AP 110 (or some other AP within communication range of STA 120). Processing block 410 may additionally receive current time from other APs also for better accuracy (by averaging the time values thus obtained), and/or redundancy as noted above. Processing block 410 programs, via path 414, timer 520 (or registers in timer 520) in RTC 440 with the current time.

Processing block 410 computes the difference between the current time values stored prior to entering hibernation mode and the current time obtained upon exit from hibernation mode. Based on the computed difference, processing block 410 determines if time-outs corresponding to layer-2 connectivity, layer-3 connectivity, IP address lease and ARP cache (as noted above) have occurred in the duration that STA 120 was in hibernation mode. If any of the time-outs have occurred, processing block 410 may renew the corresponding connection (in the case of layer-2 or layer-3 connection time-out) or renew the IP address lease, or update the ARP cache.

5. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method performed in a wireless station, said method comprising:
    hibernating in a duration;
    switching off an oscillator in at least a part of said duration, wherein said oscillator is used to drive a portion of said wireless station;
    prior to said switching off, recording a time point at which said hibernating started;
    based on a time stamp and said time point, computing a magnitude of said duration;
    determining whether an expiry duration has elapsed based on said magnitude; and
    if said expiry duration has elapsed, concluding that said duration of hibernating has expired.

2. The method of claim 1, wherein said wireless station comprises a transmit circuit and a receive circuit, wherein said portion, said transmit circuit and said receive circuit are powered off in said duration to cause said hibernating.

3. The method of claim 2, wherein said portion is a digital portion, and wherein said wireless station is unable to both transmit and receive packets in said duration.

4. The method of claim 1, wherein said portion comprises a time keeping circuit for maintaining time based on said oscillator, wherein said time keeping circuit is rendered inoperative in said duration due to switching off of said oscillator, said method further comprising:
    switching on said oscillator to exit hibernation due to said hibernating;
    retrieving a time stamp from an access point (AP) upon exiting said hibernation; and
    programming one or more registers in said time keeping circuit based on said time stamp.

5. The method of claim 1, wherein said expiry duration is represented by a communication entry including any of a layer-2 connection time-out, DHCP (Dynamic Host Configuration Protocol) lease time, TCP (Transmission Control Protocol) connection time out and ARP (Address Resolution Protocol) cache timeout.

6. A wireless station comprising:
    an oscillator;
    a circuit portion driven by said oscillator; and
    a processor to cause said wireless station to:
        hibernate in a duration, wherein said processor switches off said oscillator in said duration,
        prior to said switching off, record a time point at which said hibernating started,
        based on a time stamp and said time point, compute a magnitude of said duration,
        determine whether an expiry duration has elapsed based on said magnitude, and
        if said expiry duration has elapsed, conclude that said duration of hibernating has expired.

7. The wireless station of claim 6, further comprising:
    a transmit circuit; and
    a receive circuit,
    wherein said processor powers off said circuit portion, said transmit circuit and said receive circuit in said duration to cause said wireless device to hibernate in said duration.

8. The wireless station of claim 7, wherein said circuit portion is a digital portion, and wherein said wireless station is unable to both transmit and receive packets in said duration.

9. The wireless station of claim 6, wherein said portion comprises a time keeping circuit for maintaining time based on said oscillator, wherein said time keeping circuit is rendered inoperative in said duration due to switching off of said oscillator, said processor further operable to:
    switching on said oscillator to exit hibernation,
    retrieve a time stamp from an access point (AP) upon exiting said hibernation, and
    program one or more registers in said time keeping circuit based on said time stamp.

10. The wireless station of claim 6, wherein said expiry duration is represented by a communication entry including any of a layer-2 connection time-out, DHCP (Dynamic Host Configuration Protocol) lease time, TCP (Transmission Control Protocol) connection time out and ARP (Address Resolution Protocol) cache timeout.

11. A non-transitory machine readable medium storing one or more sequences of instructions for operating a wireless station, wherein execution of said one or more instructions by one or more processors contained in said wireless device enables said wireless station to perform the actions of:

hibernating in a duration;

switching off an oscillator in at least a part of said duration, wherein said oscillator is used to drive a portion of said wireless station;

prior to said switching off, recording a time point at which said hibernating started;

based on a time stamp and said time point, computing a magnitude of said duration;

determining whether an expiry duration has elapsed based on said magnitude; and if said expiry duration has elapsed, concluding that said duration of hibernating has expired.

12. The non-transitory machine readable medium of claim 11, wherein said wireless station comprises a transmit circuit and a receive circuit, wherein said portion, said transmit circuit and said receive circuit are powered off in said duration to cause said hibernating.

13. The non-transitory machine readable medium of claim 12, wherein said portion is a digital portion, and wherein said wireless station is unable to both transmit and receive packets in said duration.

14. The non-transitory machine readable medium of claim 11, wherein said portion comprises a time keeping circuit for maintaining time based on said oscillator, wherein said time keeping circuit is rendered inoperative in said duration due to switching off of said oscillator, said non-transitory machine readable medium further comprising instructions for:

switching on said oscillator to exit hibernation due to said hibernating;

retrieving a time stamp from an access point (AP) upon exiting said hibernation; and programming one or more registers in said time keeping circuit based on said time stamp.

15. The non-transitory machine readable medium of claim 11, wherein said expiry duration is represented by a communication entry including any of a layer-2 connection time-out, DHCP (Dynamic Host Configuration Protocol) lease time, TCP (Transmission Control Protocol) connection time out and ARP (Address Resolution Protocol) cache timeout.

* * * * *